P. KOPCZYK.
SPRING SHACKLE.
APPLICATION FILED SEPT. 4, 1915.

1,193,156.

Patented Aug. 1, 1916.

Inventor
PETER KOPCZYK

By Watson E. Coleman
Attorney

UNITED STATES PATENT OFFICE.

PETER KOPCZYK, OF ARCADIA, PENNSYLVANIA.

SPRING-SHACKLE.

1,193,156.  Specification of Letters Patent.  Patented Aug. 1, 1916.

Application filed September 4, 1915. Serial No. 49,037.

*To all whom it may concern:*

Be it known that I, PETER KOPCZYK, a citizen of the United States, residing at Arcadia, in the county of Indiana and State of Pennsylvania, have invented certain and useful Improvements in Spring-Shackles, of which the following is a specification, reference being had to the accompanying drawings.

My invention relates to spring links or shackles such as are used in the connection of traces to swingletrees or in any circumstances where it is desirable to cushion or take up strain or shock applied to an object. In all forms of spring shackle or link known to me, after the compression of the cushion spring the draft strain comes upon the spring itself, thus often causing the spring to break or so compressing it as to reduce its resilience.

The primary object of my invention is to provide a very simple spring shackle or link, so constructed that when draft is applied to it the spring will be compressed to a certain predetermined degree and that the strain will be thus applied directly to the draft bar so as to no further compress the spring. This relieves the continuous strain on the spring and prevents the breakage of the spring.

Another object of the invention is to so construct the shackle or link that it may be very readily made and the parts readily assembled.

Other objects will appear in the course of the following description.

Figure 1:
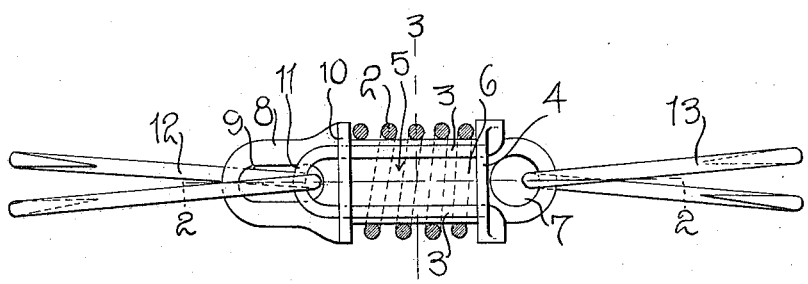
Figure 2:
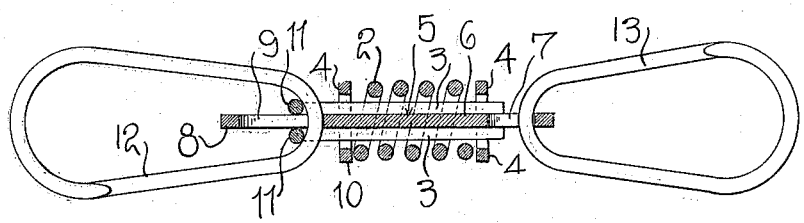
Figure 3:
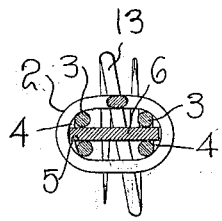

My invention is illustrated in the accompanying drawings, wherein:

Figure 1 is a side elevation of my draft appliance, the spring being in section; Fig. 2 is a longitudinal section on the line 2—2 of Fig. 1; Fig. 3 is a transverse section on the line 3—3 of Fig. 1.

Referring to the drawings it will be seen that this shackle comprises a coiled spring 2 which may be made of metal either flat or round in cross section, this spring being coiled to provide a spring tube, as it may be called, slightly elliptical in end view. Disposed within the spring is a shank consisting of two U-shaped members each designated 3, the legs of these U-shaped members being connected in any suitable manner to an annular member 4 forming an abutment against which the spring bears. This annular member is somewhat oval in shape, as the tube formed by the spring is oval.

Coacting with the U-shaped members 3 and the member 4 is a draft bar designated generally 5. This has a flat shank 6 which is adapted to be disposed between the U-shaped members 3 and within the spring 2. One end of the shank is formed with the opening 7, while at its opposite end the shank is enlarged to form a head 8 which is flat and disposed in the plane of the shank and which is provided with the elongated opening or slot 9. At the junction of the shank with the head 8 there is provided the annular member 10 which constitutes an abutment against which the spring bears and which provides for a projection of the closed ends 11 of the U-shaped members 3 through the annular member on each side of the shank and the head so that the loops or closed ends 11 of the U-shaped members will project beyond the inner end of the elongated opening 9. Any suitable draft connection may be engaged with the opening 7 at one end of the draft bar while any other suitable draft connection, as for instance a hook or loop, is engaged in the looped or closed ends 11 of the U-shaped members 3 and through the slot 9 of the draft bar.

When strain is applied to the draft connection 12 the first action will be to draw upon the U-shaped members 3, drawing the abutment 4 toward the abutment 10 and compressing the spring between them. This movement of the members 3 and 4 and compression of the spring will continue until the draft connection 12 strikes the forward end of the slot 9, whereupon the strain will be transmitted directly to the draft bar 5 and thus to the draft connection 13 engaging the draft bar. At this time the spring will only be partially compressed and when this occurs the strain is taken off of the spring and applied directly to the bar 5. This relieves the continuous strain on the spring and prevents breakage of the spring. Of course the amount of compression to which the spring is subjected will depend upon the length of the slot 9.

While I do not wish to be limited to any particular use for this draft shackle, it is obvious that it may be used in connection with the traces on heavy harness and as a coupling between mine cars. The principle of the invention may be also applied to the draw bars of locomotives and railway cars, and in fact it may be used in any situation where it is necessary to cushion the draft strain or shock.

Having thus described my invention, what I claim is:

1. A spring shackle of the character described comprising draft members having sliding engagement with each other, a spring resisting relative longitudinal movement of the draft members, one of the draft members having an elongated opening and the other having an opening overlying the elongated opening, the last-named draft member being held by the spring with its opening overlapping the rear end of the elongated loop, a draft connection engaged with one end of the first-named draft member, and a draft connection engaging and extending through the opening of the second member and passing through the elongated opening of the first-named member whereby one of the draft members will have movement relative to the other draft member to compress the spring to a predetermined degree, the draft so applied being then transmitted directly to the other member.

2. A spring shackle of the character described, comprising a coiled spring, a draft member having a shank extending through the spring and an abutment bearing against one end of the spring, the shank beyond said abutment being formed with an elongated opening, a draft member having sliding engagement with the shank and having an abutment engaging against the opposite end of the spring, said draft member extending through the first-named abutment and having an opening registering with the elongated opening in the first named draft member, a draft connection engaging that end of the first named member opposite the abutment, and a draft connection engaging that end of the second named member which projects through the abutment on the first named member and also engaging through the elongated opening of said first named member.

3. A spring shackle of the character described, comprising a coiled spring, a draft member having a head, an abutment extending at right angles thereto and bearing against one end of the spring and a shank extending through the spring, the head being formed with a longitudinally elongated opening, the end of the shank being formed with an opening, a draft connection engaging with the last named end of the shank, a draft member comprising an annular abutment surrounding the shank and bearing against the other end of the spring and U-shaped members attached to the abutment extending through the spring and through the abutment on the first-named draft member, the ends of said U-shaped members overlapping the elongated opening in the head of the first named member, and a draft connection passed through the closed ends of the second named member and through the elongated opening of the head, the length of the spring when uncompressed being greater than the length of said elongated opening whereby when the spring is partly compressed strain should be applied directly to the said draft bar.

In testimony whereof I hereunto affix my signature in the presence of two witnesses.

PETER KOPCZYK.

Witnesses:
MARGARET E. PATRICK,
LEVI CONNER.

Copies of this patent may be obtained for five cents each, by addressing the "Commissioner of Patents, Washington, D. C."